United States Patent
Andersson

(10) Patent No.: US 8,457,786 B2
(45) Date of Patent: Jun. 4, 2013

(54) METHOD AND AN APPARATUS FOR CALIBRATION OF AN INDUSTRIAL ROBOT SYSTEM

(75) Inventor: Bjorn E. Andersson, Västerås (SE)

(73) Assignee: ABB Technology Ltd, Zurich (CH)

( * ) Notice: Subject to any disclaimer, the term of this patent is extended or adjusted under 35 U.S.C. 154(b) by 925 days.

(21) Appl. No.: 12/527,759

(22) PCT Filed: Nov. 25, 2008

(86) PCT No.: PCT/EP2008/066123
§ 371 (c)(1),
(2), (4) Date: Sep. 17, 2009

(87) PCT Pub. No.: WO2010/060459
PCT Pub. Date: Jun. 3, 2010

(65) Prior Publication Data
US 2011/0022216 A1    Jan. 27, 2011

(51) Int. Cl.
| | | |
|---|---|---|
| G06F 19/00 | (2011.01) | |
| G05B 19/418 | (2006.01) | |
| G05B 19/04 | (2006.01) | |
| B43L 13/20 | (2006.01) | |
| G01B 3/00 | (2006.01) | |

(52) U.S. Cl.
USPC ............. 700/245; 33/565; 33/558.2; 700/97; 700/248; 700/264

(58) Field of Classification Search
USPC ................... 33/565, 558.2; 700/97, 245, 248, 700/264
See application file for complete search history.

(56) References Cited

U.S. PATENT DOCUMENTS

| | | | | |
|---|---|---|---|---|
| 4,305,130 | A * | 12/1981 | Kelley et al. | 700/259 |
| 4,372,721 | A * | 2/1983 | Harjar et al. | 700/254 |
| 4,530,456 | A * | 7/1985 | Michelotti | 228/102 |
| 4,590,578 | A * | 5/1986 | Barto et al. | 700/254 |
| 4,675,502 | A * | 6/1987 | Haefner et al. | 219/124.34 |
| 4,700,118 | A * | 10/1987 | Kishi et al. | 318/568.19 |
| 4,815,006 | A * | 3/1989 | Andersson et al. | 700/254 |
| 4,831,232 | A * | 5/1989 | Andersson et al. | 219/124.34 |
| 4,831,549 | A * | 5/1989 | Red et al. | 700/254 |
| 4,870,592 | A * | 9/1989 | Lampi et al. | 700/112 |
| 5,143,270 | A * | 9/1992 | Hamada et al. | 228/4.1 |
| 5,268,837 | A * | 12/1993 | Saylor | 700/61 |
| 5,463,297 | A * | 10/1995 | Hara et al. | 318/568.13 |
| 5,910,719 | A * | 6/1999 | Thorne | 318/560 |

(Continued)

FOREIGN PATENT DOCUMENTS

JP    2007-313593    12/2007

*Primary Examiner* — Charles Kasenge
*Assistant Examiner* — Thomas Stevens
(74) *Attorney, Agent, or Firm* — Dilworth & Barrese, LLP.

(57) ABSTRACT

An industrial robot system has at least one robot (1) having a robot coordinate system ($x_{r1}$, $y_{r1}$, $z_{r1}$) and a positioner (2) having a positioner coordinate system ($x_p$, $y_p$, $z_p$) and adapted to hold and change orientation of a workpiece by rotating about a rotational axis. Target points for the robot are programmed with respect to an object coordinate system ($x_{o1}$, $y_{o1}$, $z_{o1}$). A robot controller (3), at least three calibration objects (24a-c) arranged on the positioner, and a calibration tool (26) held by the robot are provided. The positions of the calibration objects are determined for at least three different angles of the rotational axis of the positioner, to determine the direction of the rotational axis of the positioner and relation between the object coordinate system and the positioner coordinate system by performing a best fit between known and determined positions of the calibration objects.

20 Claims, 6 Drawing Sheets

U.S. PATENT DOCUMENTS

| | | | |
|---|---|---|---|
| 6,317,699 B1 * | 11/2001 | Watanabe et al. | 702/94 |
| 6,349,245 B1 * | 2/2002 | Finlay | 700/245 |
| 6,615,112 B1 * | 9/2003 | Roos | 700/254 |
| 6,812,665 B2 * | 11/2004 | Gan et al. | 318/568.11 |
| 7,130,718 B2 * | 10/2006 | Gunnarsson et al. | 700/254 |
| 2002/0188379 A1 * | 12/2002 | McGee et al. | 700/245 |
| 2003/0167103 A1 * | 9/2003 | Tang et al. | 700/254 |
| 2003/0200042 A1 | 10/2003 | Gan et al. | |
| 2007/0009344 A1 * | 1/2007 | Wirth et al. | 414/217 |
| 2007/0181548 A1 * | 8/2007 | Kaddani et al. | 219/130.21 |
| 2007/0269297 A1 * | 11/2007 | Meulen et al. | 414/222.01 |
| 2009/0285666 A1 * | 11/2009 | Kilibarda | 414/806 |

* cited by examiner

METHOD AND AN APPARATUS FOR CALIBRATION OF AN INDUSTRIAL ROBOT SYSTEM

BACKGROUND OF THE INVENTION

1. Field of the Invention

The present invention relates to a method and an apparatus for calibration of an industrial robot system comprising: at least one robot having a first robot coordinate system and configured to process a workpiece, and a positioner adapted to hold the workpiece and to change the orientation of the workpiece by rotating it about a rotational axis while the robot processes the workpiece.

2. Prior Art

Industrial robots are highly flexible devices used for a wide variety of operations in many different industrial applications. Robots are programmed to follow a path including a plurality of target points. The robot program includes the positions of the target points, which define the programmed path. The conventional method to program a robot is to teach the robot the path by manually moving the TCP (Tool Center Point) of the robot to the target points along the path and storing the robot positions for each target point. A TCP is defined for each robot tool. In a basic robot system the positions of the target points are programmed with respect to the robot coordinate system. However, if the robot has to be replaced, the new robot has to be placed in exactly the same position as the original robot, or the new robot has to be reprogrammed.

By defining the path with respect to a local coordinate system defined with respect to fixture, holding the workpiece to be processed by the robot, the accuracy of the path with respect to the workpiece will not depend on the robot's position relative to the fixture as long as the fixture coordinate system can be defined with respect to the robot coordinate system. The fixture coordinate system may be defined by three reference points. The reference points may be defined by manually jogging the TCP, Tool Center Point, of the robot to each of reference points. In the case of an arc welding robot, the TCP is defined as the weld wire tip.

Instead of manually jogging the TCP to the reference points, they are often defined as the result of automatic searches. In the case of arc welding robots a common search method is to place a voltage between the wire tip and the workpiece. As the TCP is interpolated towards the workpiece, physical contact is detected when a current is found to be flowing from the welding torch tip to the workpiece. The robot is stopped when contact is detected. Another search method uses electrical contact in the same way as in the example above, but instead of touching the workpiece with the welding gun wire tip a tooling ball attached to the welding gun is brought in contact with a plurality of tooling balls fixed on the workpiece or fixture. By executing several searches towards the fixed tooling ball, a number of positions where the ball attached to the welding torch is touching the fixed ball are measured, thereby enabling calculation of the centre of the fixed tooling ball.

It is common, for example in arc welding, to mount the fixture holding the workpiece on a positioner with one or more degrees of freedom to achieve access to the workpiece at optimum welding angles. The positioner is adapted to change the orientation of the workpiece by rotating it about one or more axes while the robot processes the workpiece. A typical positioner includes a motor, a gearbox, a rotational disc, and a fixture adapted to fixedly hold one or more workpieces. The fixture is firmly connected to the rotational disc and rotatable about a rotational axis, which is actuated by the motor. In this case the target points on the robot path are programmed with respect to an object coordinate system defined with respect to the rotational disc of the positioner. If the robot or the positioner for some reason has to be replaced, it is necessary to recalibrate the position of the robot relative to the positioner in order to be able to use the same robot program without having to adjust the target points. Further, if the positioner has two or more stations, each with its own fixture, and the robot is carrying out the same task on each station, it is possible to use the same robot program at all stations by calibration of a unique coordinate system for each station.

The programming of robots is a time-consuming process and the conventional methods of using the robot during the programming and the teaching process ties up the production equipment and delays production start. In order to save time and speed production start, it is desirable to program a robot off-line. Conventionally, this is done through a graphical simulation by an off-line programming tool. The programming tool contains a graphical component for generating a graphical 3D representation of the robot, the positioner, and work objects in the robot cell based on graphical models, for example CAD models. The programming tool further contains a graphical means for teaching target points of the path. The graphical simulation provides a natural and easy method for programming and visualizing an industrial robot.

During off-line programming of a robot system including a robot and a positioner, the positions of the target points are defined with respect to a nominal object coordinate system, which in turn is defined with respect to a nominal positioner coordinate system, which is defined with respect to the base coordinate system of the robot. The nominal coordinate system is an ideal coordinate system defined by the graphic layout of the off-line programming system. Commonly, the positioner coordinate system is defined with respect to the rotational disc of the positioner, such that the origin of the positioner coordinate system is located at the rotational disc, the z-axis of the positioner coordinate system is defined as the rotational axis of the positioner, and the x- and y-axes are parallel with the surface of the rotational disc. Traditionally, the base coordinate system of the robot is positioned in the base of the robot with the z-axis aligned with the first rotational axis of the robot. When the off-line programming is completed, the program including the target positions are transferred to the control system of the robot.

However, a robot program prepared by an off-line programming system cannot directly be used for operating a robot in a real robot cell, because the positional relationship between the robot, the positioner, and the objects in the off-line environment may deviate from the actual positional relationship between the robot, the positioner, and the objects in the real robot cell. Further, the relation between the base coordinate system of the real robot and the coordinate system of the real positioner has to be determined.

Today, the relation between the base coordinate system of the robot and the coordinate system of the positioner is determined by marking out a reference point on the rotational disc of the positioner, providing the robot with a calibration tool in the form a sharp tip, rotating the axis of the positioner so that the reference point is rotated into at least three different angles, manually moving the robot so that the tip of the calibration tool is in contact with the marked reference point at the three different angles of the axis, and determining the positions of the reference point for the three angles in the base coordinate system of the robot. The determined positions form a circle and the center point of the circle is the origin of the positioner coordinate system. The plane of the circle is the xy-plane of the coordinate system. The direction of the normal to the xy-plane is determined to be the direction of the rotational axis of the positioner, and thus the z-axis of the coordinate system. A problem with this method is that the accuracy of the calibration depends on the skill of the robot operator to move the robot so that the calibration tip correctly points at the calibration point. If the reference points are not measured in exactly the same point at the rotational disc, the plane of the circle will not be entirely parallel to the plane of the rotational disc. Since the radius of the rotational disc is much smaller than the distance to the other fixing point of the axis, a small error in the positions of the reference points will cause an angular error in the z-axis, which leads to a large position error of the calibration.

In some applications, it is common to have two or more robots working on one or more workpieces held by the same positioner and rotated about the same axis or axes. The robots may perform different processes on the same workpiece or parallel processes on different workpieces. In other applications, it is also common to have a positioner with a plurality of workstations, each with one or more rotating axis, and two or more robots working on each workstation. The positioner is rotatable about a vertical axis so that the workstations are moved between the robots. In a robot system including two or more robots and a positioner including one or more workstations, the calibration of the robot system becomes very complicated and time-consuming. For example, it is necessary to determine the relation between the base coordinate systems for robots, and to determine the relation between each object coordinate system and the positioner coordinate system.

Further, for many applications there is a high demand on the accuracy of the processing of the workpiece, which also leads to a high demand on the accuracy of the calibration of the robot system. For example, in welding applications there is a high demand on the accuracy of the welding,

OBJECTS AND SUMMARY OF THE INVENTION

The object of the present invention is to improve the calibration of an industrial robot system including one or more robots and a positioner. In particular, the object is to provide a calibration with high accuracy.

According to one aspect of the invention, this object is achieved with a method as defined herein.

Such a method comprises:
defining a positioner coordinate system for the positioner in which the rotational axis of the positioner is one of the axes of the positioner coordinate system,
providing the positioner with at least three calibration objects, which positions are known in the first object coordinate system,
providing the robot with a calibration tool,
determining the positions of at least three of the calibration objects with respect to the first robot coordinate system by means of the robot and the calibration tool,
rotating the positioner about its rotational axis,
determining the positions of a first of the calibration objects for at least three different angles of the rotational axis by means of the robot and the calibration tool,
determining the positions of a second of the calibration objects, located at a distance from the first calibration object along the rotational axis of the positioner, for at least three different angles of the axis,
determining the direction of the rotational axis of the positioner in the first robot coordinate system based on the determined positions of the first and second calibration objects for the at least three different angles of the axis,
converting the positions of the at least three calibration objects determined with respect to the first robot coordinate system and the positions of the at least three calibration objects known with respect to the first object coordinate system into a common coordinate system, and
determining the relation between the first object coordinate system and the positioner coordinate system by performing a best fit between the known and the determined positions of the at least three calibration objects in the common coordinate system.

The calibration method according to the invention comprises at least determining the direction of the rotational axis of the positioner in the robot coordinate system and determining the relation between the object coordinate system and the positioner coordinate system. The calibration method according to the invention significantly increases the accuracy of the calibration.

The method also makes it possible to automatically carry out the calibration of the robot system, and thereby to speed up the calibration process. Further, the calibration result will be independent of which robot operator is carrying out the calibration. Thus, the calibration method according to the invention is repeatable, which means that the same result is achieved if the calibration is repeated.

There exist several known methods for automatically determining the position of an object by means of a robot and a tool. For example, the robot is programmed to move towards the calibration object and the robot position is read when the tool is in contact with the object. The point in time when the tool is in contact with the object is detected, for example, by detecting increased motor current, or with an external sensor. As an alternative the robot controller may be allowed to complete the interpolation towards the programmed search point, but by removing the integration portion of the servo loop allowing the calibration tool to stay in contact with the search surface without buildup of excessive force.

The robot coordinate system is a coordinate system defined with respect to a physical part of the robot, for example, the base coordinate system of the robot, which is defined with respect to the base plate of the robot.

The positioner coordinate system is defined once for the positioner. The definition is, for example, stored in a configuration file on the robot controller. For example, the z-axis of the positioner coordinate system is defined as the rotational axis of the positioner and the x- and y-axes are defined with respect to the position of the rotational disc and one of the calibration objects.

The target points for the robot are programmed with respect to an object coordinate system, which can be either an actual or a nominal object coordinate system. If the robot has been programmed off-line by means of a simulation tool, the target points are programmed with respect to a nominal object coordinate system. If the robot has been programmed by teaching, the target points are programmed with respect to an actual object coordinate system. For example, the original robot program can be programmed off-line, and later some of the target points are reprogrammed by teaching the robot the new positions of the target points. In that case, the original positions of the target points are programmed with respect to a nominal object coordinate system and the positions of the reprogrammed target points are programmed with respect to an actual object coordinate system after calibration of the coordinate system, to reflect its actual position with respect to the positioner coordinate system. However, the calibration method according to the invention is useful in both cases, independently of whether the target points are programmed in an actual or in a nominal object coordinate system.

According to the invention, the direction of the rotational axis of the positioner is determined based on determined positions for at least three different angles of the axis of the positioner, for a first and a second calibration object, and the second calibration object is located at a distance from the first calibration object along the rotational axis of the positioner. More precisely, the position and direction of the rotational axis is determined by computing a first position on the axis as the center of a first circle defined by the determined positions of the first calibration object, and computing a second position on the axis as the center of a second circle defined by the determined position of the second calibration object. The direction of the rotational axis is determined based on the computed first and second positions on the axis. This makes it possible to determine the direction of the axis of the positioner based on two positions on the rotational axis located at a distance from each other, thereby increasing the accuracy of the determination of the direction of the axis of the positioner. By increasing the distance between the first and second calibration objects, the accuracy of the calibration is increased. The positioner is rotated approximately half a revolution. If the positioner is adapted to hold the workpiece and to change the orientation of the workpiece by rotating it about more than one rotational axis, the additional rotational axes can be determined in the same way according to the invention.

The positions of the calibration objects are known in the object coordinate system. According to the invention, the positions of the calibration objects are further determined with respect to the robot coordinate system. The known and the determined positions of the calibration objects are converted into a common coordinate system, and the relation between the object coordinate system and the positioner coordinate system is determined by performing a best fit between the known positions of the calibration objects and the determined positions of the calibration objects in the common coordinate system. The common coordinate system can be any of the object coordinate system, the positioner coordinate system, or the robot coordinate system. By best fit is meant that a known best-fit method, such as method of least squares, is used for fitting the known positions with the determined positions of the calibration objects and to calculate a transformation that provides the best fit.

The calibration objects must be at least three, and preferably at least five in order to increase the accuracy of the calibration. Two of the calibration objects can be the first and second calibration objects used for determining the rotational axis of the positioner. In that case the positions determined for the first and second calibration objects for one angle of the axis of the positioner can also be used for determining the relation between the object coordinate system and the positioner coordinate system. However, it is also possible to use different calibration objects for determining the relation between the object coordinate system and the positioner coordinate system and for determining the direction of the rotational axis of the positioner.

The calibration objects are provided at one or more of the rotational parts of the positioner. Preferably, the calibration objects are provided on the surface of the fixture of the positioner. However, it is also possible to locate one of the calibration objects at the rotational disc of the positioner.

The positions of the first calibration object are determined by means of the robot and its calibration tool. This means that the first calibration object must be positioned in the working range of the robot. If the robot system to be calibrated includes only one robot, both calibration objects are located within the working range of the robot, and the positions of both calibration objects are determined by means of the robot. However, if the robot system to be calibrated includes two or more robots working on one or more workpieces, which are moved about the same rotational axis, the positions of the first calibration object are determined by means of the first robot, and the positions of the second calibration object are preferably determined by means of the second robot. Accordingly, the first calibration object must be located in the working range of the first robot and the second calibration object must be located in the working range of the second robot. An advantage with determining the positions of the calibration objects with two different robots is that it makes it possible to increase the distance between the calibration objects, and thereby to increase the accuracy of the calibration. A further advantage with using two robots for measuring the positions of the first and second calibration objects is that making the robot work at the outer limit of its working range, in which the accuracy of the measurements will be poorer than if the measurements are made in a central part of the working area, is avoided.

According to an embodiment of the invention, the calibration objects are positioned in or in close vicinity to the area in which the robot is about to process the workpiece, i.e. in the middle of the working area of the robot. If two robots are used for measuring the positions of the calibration objects, the calibration objects are located in or close to the process area of the robot that is measuring the position of the calibration object. The process area, i.e. the area in which the robot is about to process the workpiece, is the area in which the target points of the robot path are located. This embodiment enables at least some of the kinematic errors of the robot to be compensated for by means of the calibration. For example, if an axis of the robot has an angle error, the same angle error is measured and corrected at the calibration. For example, if the first axis of the robot has en angle error, the error will be compensated as a position error in parallel with the z-axis of the positioner in the center of the working area of the robot.

In some applications the robot system comprises a second robot having a second robot coordinate system and configured to process a workpiece, and the positioner is adapted to hold the workpiece and to change the orientation of the workpiece by rotating it about the same rotational axis as described with reference to the first robot, while the second robot processes the workpiece. Target points for the second robot are programmed with respect to a second object coordinate system. The at least three calibration objects are located within the working range of both the robots, and the positions of the calibration objects are also known in the second object coordinate system.

According to an embodiment of the invention, the method further comprises:
    providing the second robot with a calibration tool,
    determining the positions of said at least three of the calibration objects in the second robot coordinate system by means of the second robot and its calibration tool,
    determining the relation between the first and second robot coordinate system, and thereby the relation between the second robot coordinate system and the positioner coordinate system, by performing a best fit between the determined positions of the calibration objects in the first robot coordinate system and the determined positions of the calibration objects in second robot coordinate system,
    converting the positions of the at least three calibration objects determined with respect to the second robot coordinate system and the positions of the at least three calibration objects known with respect to the second object coordinate system into a common coordinate system, and determining the relation between the second object coordinate system and the positioner coordinate system by performing a best fit between the known and the determined positions of the at least three calibration objects in the common coordinate system.

With a robot system comprising two robots working on the same workstation of the positioner, it is necessary to determine the relation between the first and second robot coordinate systems, and the relation between the second object coordinate system and the positioner coordinate system. The positions of the at least three calibration objects have already been determined in the first robot coordinate system. The calibration further comprises determining the positions of the same at least three calibration objects in the second robot coordinate system. The determined positions are used for determining the relation between the first and second robot coordinate systems, as well as for determining the relation between the second object coordinate system and the positioner coordinate system. The relation between the first and second robot coordinate systems is determined by performing a best fit between the positions of the calibration objects determined in the first robot coordinate system and determined in the second robot coordinate system. The relation between the second object coordinate system and the positioner coordinate system is determined by calculating a transformation that provides a best fit between the positions of the calibration objects known in the object coordinate system and positions of the calibration objects determined in the second robot coordinate system. To be able to perform a best fit between the known and determined positions, they have to be transformed into a common coordinate system before performing the best fit. Also this part of the calibration can advantageously be carried out automatically.

According to an embodiment of the invention, the calibration objects are spherical and the calibration tool has a tip of a spherical shape, and the method comprises determining the tool center points of the calibration tool, and automatically determining the positions of the calibration objects by repeatedly moving the robot to the calibration object such that the calibration tool is in contact with the calibration object at a plurality of different contact points, reading the robot positions at the contact points, and calculating the center point of the calibration object in the robot coordinate system based on the read robot positions and the tool center point of the calibration tool. As the robot positions at several different contact points are read, it is not critical where the calibration tool hits the calibration object. This method is suitable for automatically determining the positions of the calibration objects with high accuracy.

According to an embodiment of the invention, the origin of the positioner coordinate system is defined in relation to a certain mechanical part of the positioner, and the method further comprises determining the tool center point of the calibration tool, moving the calibration tool of the robot into contact with said part of the positioner, reading the robot position during the contact, and determining the origin of the coordinate system of the positioner based on the read robot position, the tool center point of the tool, and the position and direction of the rotational axis. For example, the part of the positioner is a rotational disc fixedly connected to one end of the rotational axis. This embodiment makes it possible to determine the origin of the positioner coordinate system.

According to an embodiment of the invention, the system comprises a mechanical unit moving the robot along a linear axis, and the method comprises: moving the robot along the linear axis, determining the position of at least one of the calibration objects for at least two different locations along the linear axis by means of the robot and the calibration tool, and determining the direction of the linear axis based on the determined positions. The mechanical unit is, for example, a linear track. This embodiment makes it possible to automatically calibrate the linear axis of the mechanical unit at the same time as the rest of the robot system is calibrated.

According to another aspect of the invention, this object is achieved by an apparatus for calibration of an industrial robot system as defined herein.

Such an apparatus comprises:
a robot controller including a processor and a data storage
at least three calibration objects arranged on the positioner, the positions of the at least three calibration objects are known in the first object coordinate system and stored in said data storage
a calibration tool to be held by the robot, and the robot controller is configured to:
automatically determine and store the positions of at least three of the calibration objects with respect to the first robot coordinate system by moving the calibration tool into contact with the calibration objects and reading the robot positions at the contact points,
instruct the positioner to rotate about its rotational axis,
to automatically determine and store the positions of a first of said calibration objects for at least three different angles of the rotational axis by moving the calibration tool into contact with the first calibration object at the three different angles and reading the robot positions at the contact points,
automatically determine and store the positions of a second of said calibration objects, located at a distance from the first calibration object along the rotational axis of the positioner, for at least three different angles of the axis, by moving the calibration tool into contact with the second calibration object at the three different angles and reading the robot positions at the contact points,
determine and store the direction of the rotational axis of the positioner in the first robot coordinate system based on the determined positions of the first and second calibration objects for the at least three different angles of the axis,
convert the positions of the at least three calibration objects determined with respect to the first robot coordinate system and the positions of the at least three calibration objects known with respect to the first object coordinate system into a common coordinate system, and to
determine and store the relation between the first object coordinate system and the positioner coordinate system by performing a best fit between the known and the determined positions of the at least three calibration objects in the common coordinate system.

Further developments of the apparatus are characterized by the features herein.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
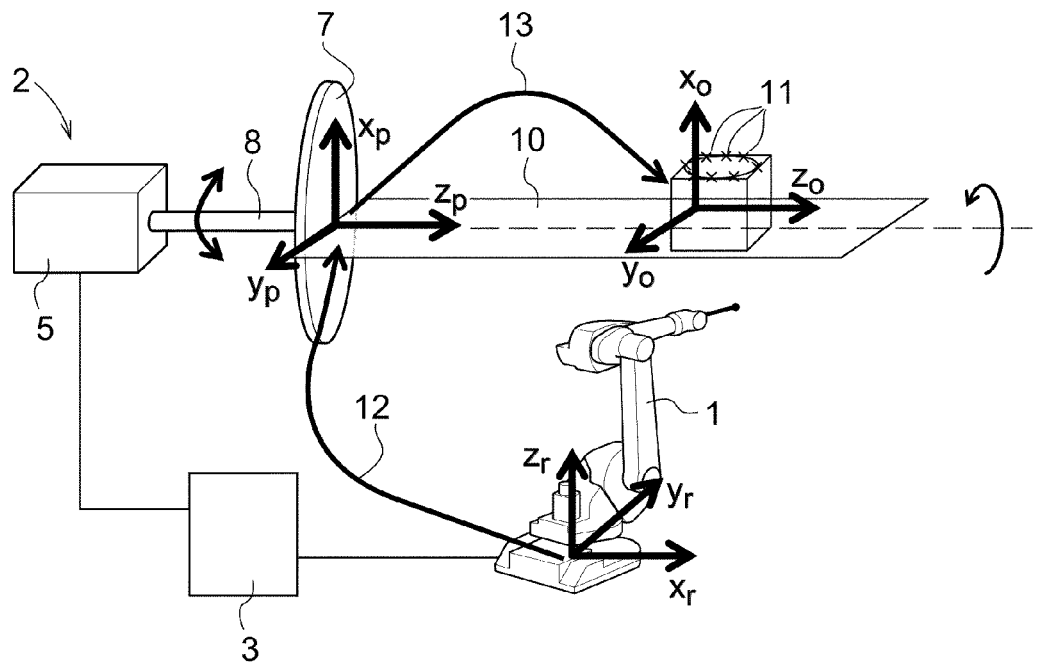
FIG. 1 shows an industrial robot system including a positioner.

FIG. 1 shows a robot system including a robot 1 and a positioner 2. In this example, the robot 1 has three main axes and three wrist axes. A stationary foot, usually referred to as the base of the robot, supports a stand that is rotatable about a first axis. The stand supports a first arm that is rotatable about a second axis. The first arm supports a second arm which is rotatable about a third axis. The second arm supports a wrist that is rotatable about a fourth, a fifth and a sixth axis. The wrist supports a tool, in which an operating point, called TCP (Tool Centre Point), is defined. The movements of the robot 1 are controlled by a robot controller 3. The positioner 2 comprises an actuator 5 including a motor and a gear box, a rotational disc 7 connected to a rotational shaft 8 driven by the motor. The positioner 2 further comprises a fixture 10 adapted to fixedly hold a workpiece while the robot carries out work on the workpiece. The fixture 10 comprises means for attaching at least one workpiece. The fixture 10 is firmly connected to the rotational disc 7, and rotatable about a rotational axis through the shaft 8. The robot controller 3 is also configured to control the motions of the rotational axis of the positioner 2.

In this example, the robot 1 has a robot coordinate system $x_r, y_r, z_r$ defined with respect to the base of the robot, and the positioner has a positioner robot coordinate system $x_p, y_p, z_p$ defined with respect to the rotational disc 7 of the positioner, such that the origin of the positioner coordinate system is located at the rotational disc, the z-axis of the positioner coordinate system is defined as the rotational axis of the positioner, and the x- and y-axis are parallel with the surface of the rotational disc.

During programming of the robot program, positions and orientation of target points 11 on a robot path are defined with respect to an object coordinate system $x_o, y_o, z_o$. If the target points 11 are programmed off-line, the object coordinate system is a nominal object coordinate system, and if the target points 11 are programmed online by teaching, the object coordinate system is the actual object coordinate system. In order to calibrate the system shown in FIG. 1, it is necessary to determine the positional relation 12 between the positioner coordinate system $x_p, y_p, z_p$ and the robot coordinate system $x_r, y_r, z_r$, and the relation 13 between the object coordinate system $x_o, y_o, z_o$ and the positioner coordinate system. The z-axis of the positioner coordinate system is defined as the rotational axis of the positioner.

Figure 2:
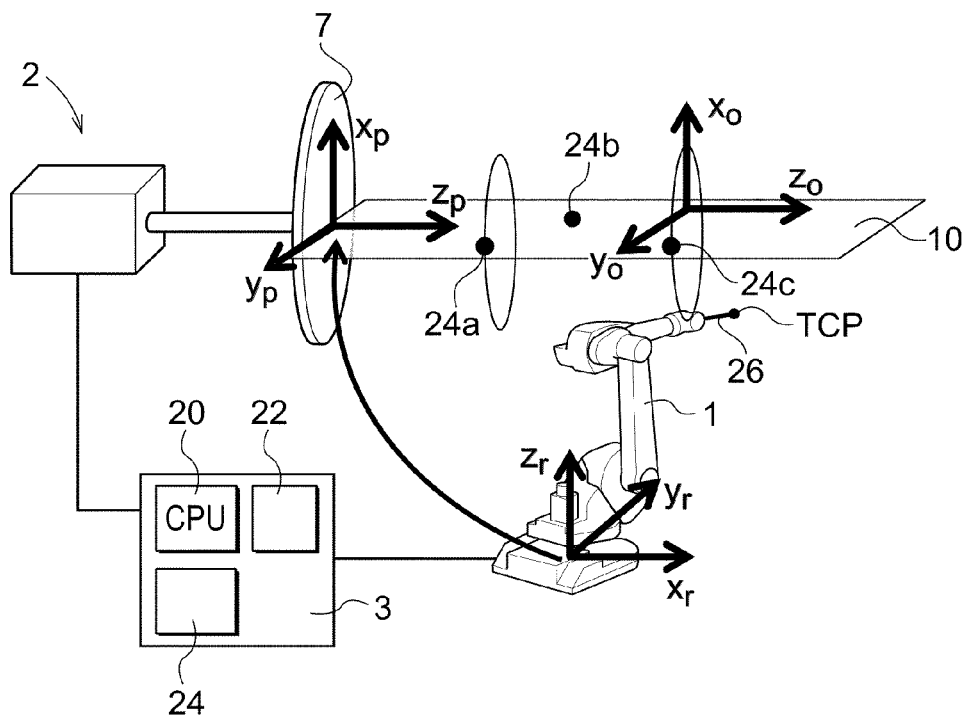
FIG. 2 shows an apparatus for calibration of an industrial robot system according to an embodiment of the invention.

FIG. 2 shows an apparatus for calibration of an industrial robot system according to an embodiment of the invention. The robot controller 3 includes hardware necessary for providing traditional robot controller functionality, such a central processing unit (CPU) 20, data storage 22 and means for communicating with the robot. The robot controller is further provided with a calibration module 24 configured to calibrate the robot system. According to this embodiment, the calibration module 24 comprises software for automatically carrying out calibration of the robot system. The calibration module 24 comprises means for automatically determining positions of calibration objects on the fixture 10 with respect to the robot coordinate system. The calibration module further comprises means for instructing the positioner to rotate about its rotational axis during calibration of the rotational axis of the positioner.

The apparatus further includes at least three, preferably at least five, calibration objects 24a-c arranged on the fixture 10 of the positioner. The positions of the calibration objects 24a-c are known in the object coordinate system $x_o, y_o, z_o$, and the known positions are stored in the data storage 22. In this example the shape of the calibration objects is spherical. Although is advantageous to have a spherical shape of the calibration objects, since it provides an accurate determination of the centre of the calibration object, it is also possible to use other shapes, such as a cone, a pin, or a cube. The calibration objects 24a-c are located within the working range of the robot 1. The positions of the calibration objects have to be determined with respect to the robot coordinate system $x_r, y_r, z_r$.

The robot 1 is provided with a calibration tool 26 held by the robot. In this example the tip of the calibration tool is a ball with a spherical shape. The tool centre point (TCP) of the calibration tool is determined according to any known method. The calibration tool 26 is used for determining the positions of the calibration objects with respect to the robot coordinate system $x_r, y_r, z_r$. The position of a calibration object is, for example, determined by repeatably moving the calibration tool until the ball of the calibration tool is in contact with the spherical calibration object, and storing the positions of the robot in the contact points. The calibration tool 26 is moved into contact with the calibration object in at least four different points. The position of the centre of the calibration object is determined based on the stored positions of the robot at the contact points, and the determined position of the TCP of the calibration tool. The positions of the calibration objects can be determined by manually jogging the robot so that the TCP of the calibration tool is in physical contact with the calibration object, or by using an automatic localization of the calibration object. An automatic localization of the calibration object can be made by means of different known methods, such as using a sensor, force control or soft servo.

In this embodiment of the invention, the calibration module 24 comprises means for automatically determining positions of the calibration objects with respect to the robot coordinate system by moving the calibration tool into contact with the calibration objects and reading the robot positions at the contact points. The robot movements are instructed by means of movement instructions in the robot program. The calibration module further comprises means for instructing the positioner to rotate about its rotational axis during calibration of the axis.

Figure 3:
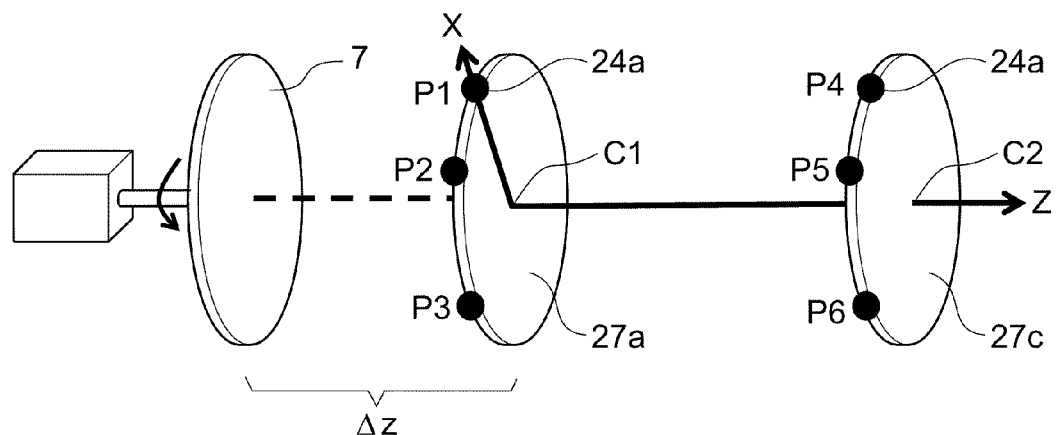
FIG. 3 illustrates calibration of the rotational axis of the positioner.
Figure 4:
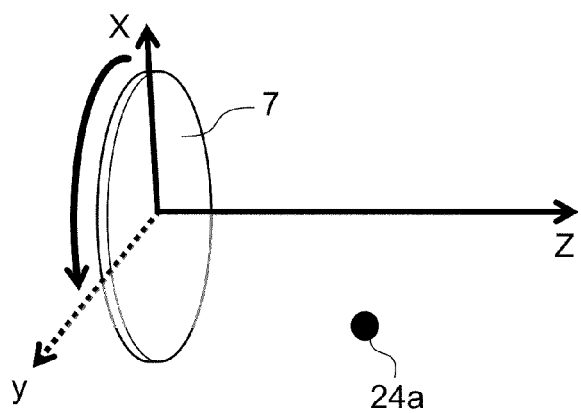
FIG. 4 illustrates calibration of a positioner coordinate system.

FIGS. 3 and 4 illustrate how to determine the relation 12 between the positioner coordinate system $x_p, y_p, z_p$ and the robot coordinate system $x_r, y_r, z_r$ according to an embodiment of the invention. In a first step the z-axis of the positioner coordinate system is determined with respect to the robot coordinate system. The z-axis of the positioner coordinate system is defined as the rotational axis of the positioner. Thus in the first step the rotational axis of the positioner has to be determined with respect to the robot coordinate system. For this purpose, two of the calibration objects 24a, 24c are used. In order to achieve a high accuracy of the calibration, calibration objects 24a, 24c should be positioned close to the edge of the fixture 10, and at as large a distance as possible from each other along the rotational axis of the positioner. During the calibration, the positioner is instructed to rotate about its rotational axis and to stop at least three different angular positions of the rotational axis, as shown in FIG. 3. The positions of the calibration objects 24a, 24c are measured by means of the robot and the calibration object for the three different angular positions of the rotational axis. During the rotation of the fixture, the motions of calibration objects 24a, 24c describe two circles, as illustrated in FIG. 2. The rotational axis of the positioner goes through the centre points of the circles. The positions of the two calibration objects 24a, 24c are determined with respect to the robot coordinate system for three different angular positions of the rotational axis of the positioner, for example by the method previously described. The positioner is rotated approximately half a revolution during the calibration.

FIG. 3 shows the positions p1-p6 of the calibration objects 24a, 24c for three different angles of the rotational axis of the positioner. The positions p1, p2, p3 of the calibration object 24a and the positions p4, p5, p6 of the calibration object 24c for the three angles of the rotation axis are determined by means of the robot and the calibration tool, as previously described. The positions p1-p3 and p4-p6 are positions on the rim of two virtual reference discs 27a, 27c. The circles mentioned above are the rims of the virtual discs. The centre points C1, C2 of the virtual discs 27a, 27c are calculated based on the determined positions of the calibration objects 24a, 24c. The direction of the rotational axis of the positioner is determined as an axis going through the centre points C1, C2 of the virtual discs. Accordingly, the direction of the z-axis of the positioner coordinate system is determined.

A temporary positioner coordinate system is defined. The z-axis of the temporary coordinate system is calculated as the vector between the two virtual discs generated by the moving calibration objects on the fixture. The x-axis of the temporary coordinate system is calculated as the vector from the centre of the first disc C1 to the first position P1 of the calibration object 24a, as shown in FIG. 3. The y-axis of the temporary coordinate system is parallel to the virtual disc 27a. The origin of the positioner coordinate system is defined at the surface of the rotational disc 7. In order to determine the origin of the positioner coordinate system, the translation distance $\Delta z$ from the origin of the temporary positioner coordinate system to the rotational disc 7 has to be determined. The translation distance $\Delta z$ is defined by expressing the position of the TCP of the calibration tool with respect to the temporary positioner coordinate system when TPC touches the rotational disc 7. The position of the rotational disc is determined by means of the robot and the calibration tool. The origin of the positioner coordinate system is determined based on the determined direction of the rotational axis and the measured position of the rotational disc 7. What remains now is to align the x-axis of the positioner coordinate system by rotating it about its z-axis, as illustrated in FIG. 4.

Figure 5:
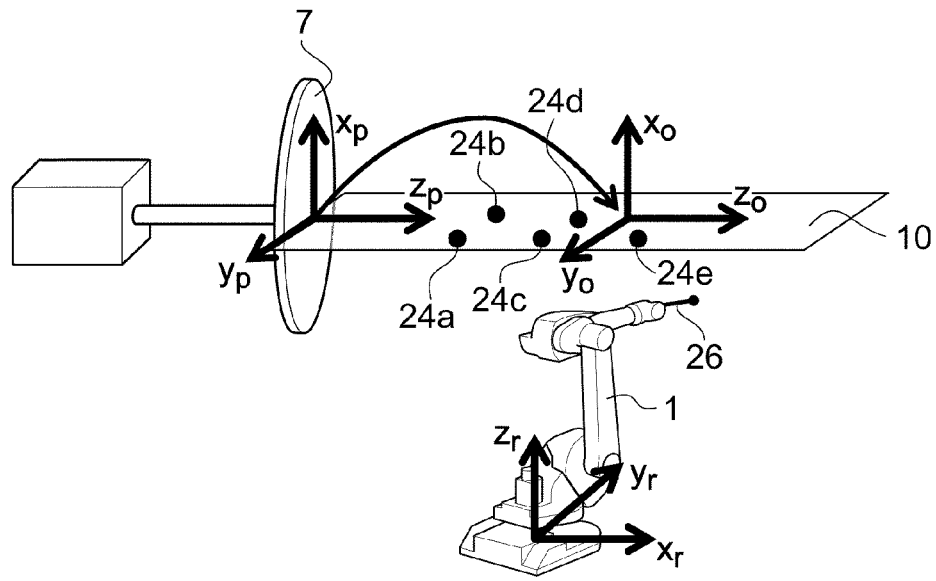
FIGS. 5 and 6 illustrate calibration of the object coordinate system with respect to the positioner coordinate system.
Figure 6:
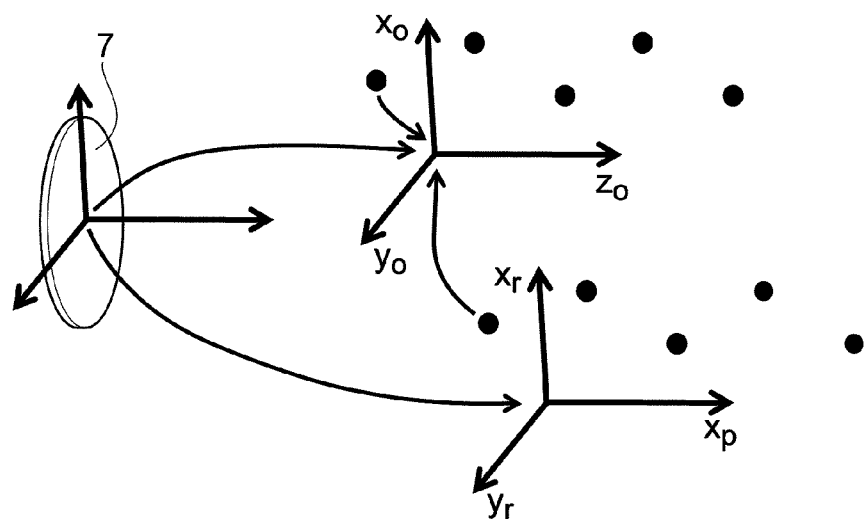

FIGS. 5 and 6 illustrate calibration of the object coordinate system $x_o$, $y_o$, $z_o$ with respect to the positioner coordinate system $x_p$, $y_p$, $z_p$. The target points on the path are programmed with respect to an object coordinate system $x_o$, $y_o$, $z_o$, as illustrated in FIG. 1. The fixture 10 of the positioner is provided with at least three calibration objects, preferably five or more calibration objects 24a-e. If the number of calibration objects is increased the accuracy of the calibration is also increased. The same two calibration objects 24a, 24c, which were used previously for calculation of the relation between the positioner coordinate system and the robot coordinate system as described with reference to FIG. 2, can be used for this calibration as well. In that case, the positions of the calibration objects 24a, 24c have already been measured. However, it is also possible to use other calibration objects. The positions of the calibration objects 24a-e are known in the object coordinate system. The positions of the calibration objects 24a-e are measured with respect to the robot coordinate system by means of the robot 1 and the calibration tool 26, for example by means of the method described with reference to FIG. 2. Thereby, the positions of the calibration objects are known with respect to the robot coordinate system and with respect to the object coordinate system.

The positions of the calibration objects measured with respect to the robot coordinate system, and the positions of the calibration objects known with respect to the object coordinate system is transformed into a common coordinate system. The common coordinate system can be any of the positioner coordinate system, the object coordinate system, or the robot coordinate system. The relation between the object coordinate system and the positioner coordinate system is calculated by performing a best fit between the known and measured positions of the calibration objects, which were known in the object coordinate system and the measured positions in the common coordinate system. By best fit is meant that the known positions and the measured positions of the calibration objects are fitted to each other in such a way that the distance between the known and the measured positions is minimized. This is, for example, done by a least mean square method. When the best fit is found the relation between the object coordinate system and the positioner coordinate system can be calculated. As the relation between the positioner coordinate system and the robot coordinate system has been determined previously, the relation between the object coordinate system and the positioner coordinate system can be calculated. Now, the positioner, the robot and the programmed path are calibrated to each other.

Figure 7A:
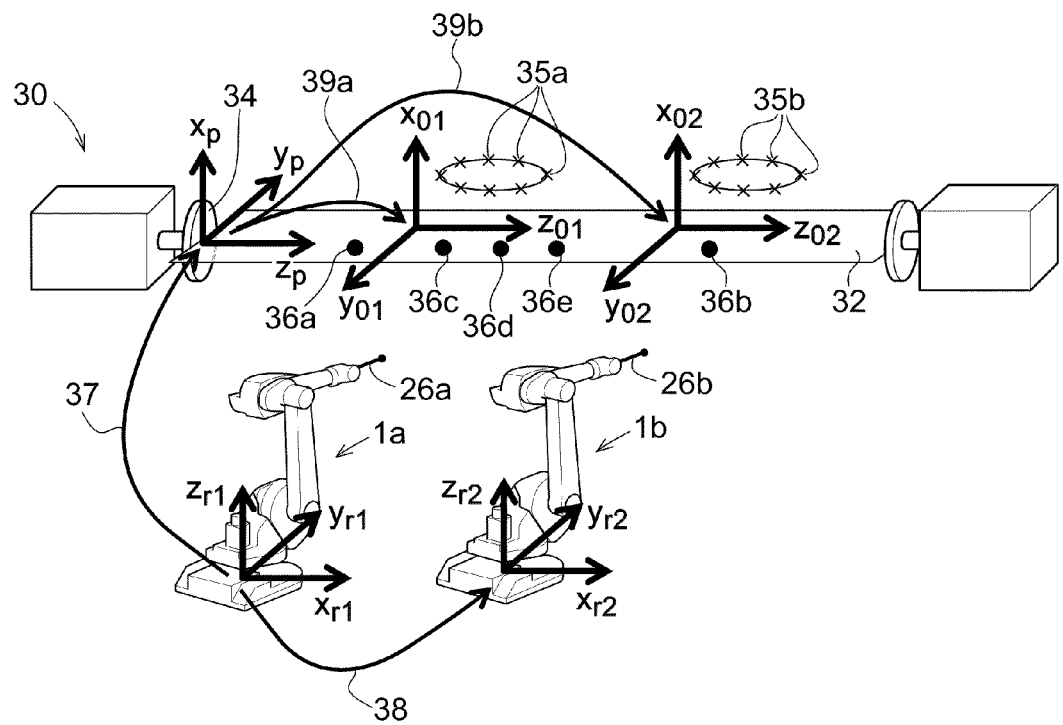
FIGS. 7a-b illustrate calibration of a robot system including two robots working on the same positioner.
Figure 7B:
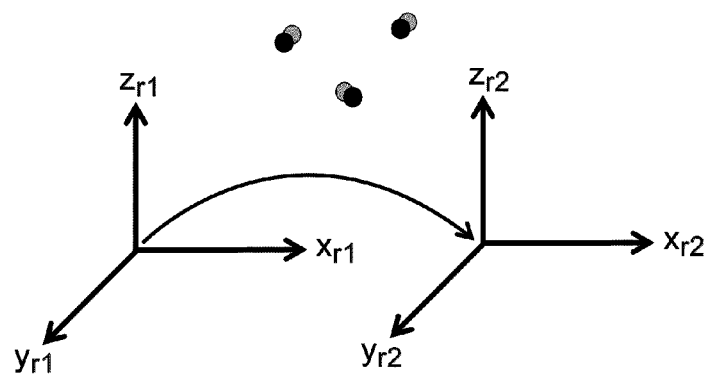

FIGS. 7a-b illustrate calibration of a robot system including two robots 1a and 1b working on the same positioner 30 having a fixture 32. The positioner is rotatable about a rotational axis, and a positioner coordinate system $x_p$, $y_p$, $z_p$ is defined with respect to the rotational axis and a rotational disc 34 of the positioner. In this example, the first robot 1a has a robot coordinate system $x_{r1}$, $y_{r1}$, $z_{r1}$ defined with respect to the base of the first robot, and the second robot 1b has a robot coordinate system $x_{r2}$, $y_{r2}$, z2r defined with respect to the base of the second robot. Target points 35a on a programmed path to be followed by the first robot 1a are defined with respect to a first object coordinate system $x_{o1}$, $Y_{o1}$, $z_{o1}$. Target points 35b programmed on a path to be followed by the second robot 1b is programmed with respect to a second object coordinate system $x_{o2}$, $y_{o2}$, $z_{o2}$.

In order to calibrate the system shown in FIG. 7a, it is necessary to determine the positional relation 37 between the positioner coordinate system $x_p$, $y_p$, $z_p$ and the first robot coordinate system $x_{r1}$, $y_{r1}$, $z_{r1}$, the relation 38 between the first robot coordinate system $x_{r1}$, $y_{r1}$, $z_{r1}$ and the second robot coordinate system $x_{r2}$, $y_{r2}$, $z_{r2}$, the relation 39a between the first object coordinate system $x_{o1}$, $y_{o1}$, $z_{o1}$ and the positioner coordinate system, and the relation 39b between the second object coordinate system $x_{o2}$, $y_{o2}$, $z_{o2}$ and the positioner coordinate system.

In the same way as previously described, the fixture 32 of the positioner is provided with a plurality of calibration objects 36a-e, preferably of a spherical shape. At least three of the calibration objects 36c-e must be provided in the working range of both the first and the second robot. Two of the calibration objects 36a, 36b are used for determining the rotational axis of the positioner. Preferably, the calibration objects 36a, 36b, used for determining the axis of the positioner, are located as far as possible from each other in order to achieve a high accuracy of the calibration. Therefore, it is suitable to locate one of the calibration objects 36a within the working range of the first robot and the other calibration object 36b within the working range of the second robot. The position of the calibration object 36a is determined by means of the first robot and the position of the second calibration object 36b is determined by means of the second robot. Alternatively, two calibration objects are selected within the working range of one of the robots and measured by the same robot.

The positions of the calibration objects 36c-e located within the working range of both the first and the second robot are measured by means of the first and the second robot, i.e. the positions of the calibration objects are determined with respect to both the first and second robot coordinate system. The first robot is provided with a calibration tool 26a and the second robot is provided with of calibration tool 26b of the same type as described with reference to FIG. 2. The positions of the calibration objects can be determined either by manually jogging the TCP of the robot to the calibration objects, or by automatic searches of the position of the calibration objects. For example, the positions of the calibration points 36c-e are determined with respect to the first robot coordinate system by moving the calibration tool 26a into contact with the calibration objects 36c-e at a plurality of contact points as previously described with reference to FIG. 2. In practice, it is suitable if the positions of all of the calibration objects are measured before calculation of relationships between the coordinate systems begins.

The relation between the positioner coordinate system and the first robot coordinate system is determined in the same way as described with reference to FIGS. 3 and 4. The relationship between the positioner coordinate system and the second robot coordinate system is established via the first robot coordinate system. Therefore, the next step is to determine the relationship between the first robot coordinate system and the second robot coordinate system. The three calibration objects 36c-e located within the working range of both the first and the second robot is used for calibration of the relation between the first robot coordinate system and the second robot coordinate system. The relation between the first and second robot coordinate systems is determined by performing a best fit between the positions of the calibration objects measured with respect to the first robot coordinate system and the positions of the calibration objects measured with respect to the second robot coordinate system, as illustrated in FIG. 7b.

The positions of the calibration objects are known in the first and second object coordinate systems. The positions of the calibration object measured with reference to the first robot coordinate system are used for determining the relation between the first object coordinate system and the positioner coordinate system. The positions of the calibration object measured with reference to the second robot coordinate system are used for determining the relation between the second object coordinate system and the positioner coordinate system. The relations between the object coordinate systems and the positioner coordinate system are determined in the same way as described with reference to FIGS. 5 and 6. The positions of the calibration objects measured with respect to the second robot coordinate system and the positions of the calibration objects known with respect to the second object coordinate system are converted into a common coordinate system, which can be any of the object coordinate system, the positioner coordinate system, or the second robot coordinate system. The relation between the second object coordinate system and the positioner coordinate system is determined by performing a best fit between the known and the measured positions of the calibration objects in the common coordinate system, in the same way as described with reference to FIGS. 5 and 6.

Figure 8:
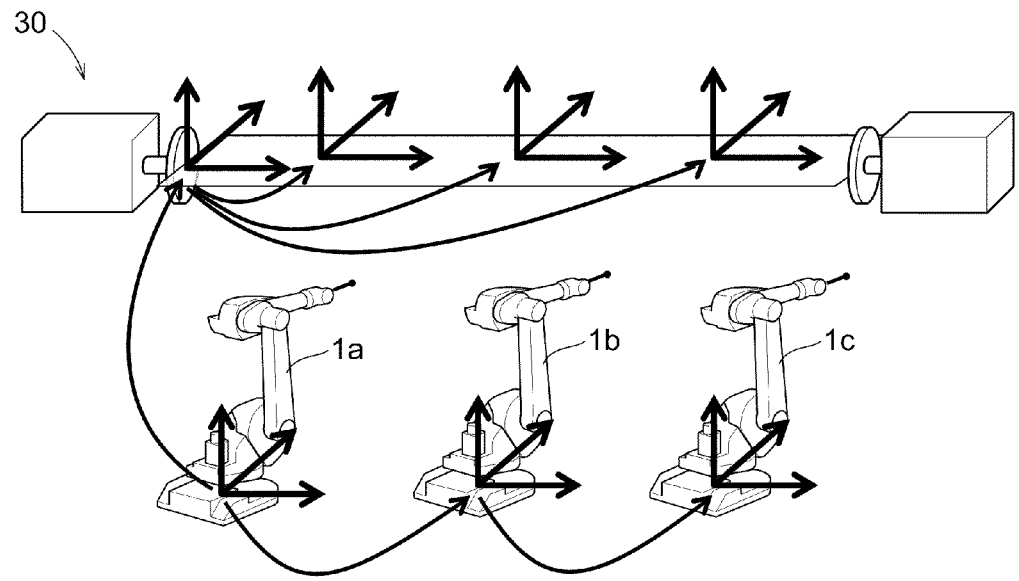
FIG. 8 illustrates calibration of a robot system including three robots working on the same positioner.

The calibration method according to the invention is useful for calibration of a robot system including a plurality of robots working on the same positioner. FIG. 8 shows a system with three robots 1a-c working on one positioner 30. If more than one robot is coordinated with the rotational axis of the positioner, the relationship between the positioner coordinate system and the additional robots will have to be established via the first robot. The relations between the robot coordinate systems for the robots are calculated with the method described with reference to FIG. 7a-b. The relation between two neighbouring robot coordinate systems is calculated by determining the position of at least three calibration objects with respect to the robot coordinate systems of the two neighbouring robots. The relation between the two coordinate systems is calculated as the transformation that creates the best fit between the two set of positions, as shown in FIG. 7b. If more than one robot is coordinated with a positioner, the second virtual reference disc 27c, as shown in FIG. 3, may be defined with respect to the robot coordinate system of the robot positioned furthest part from the first robot and the virtual reference disc 27a is defined with respect to the first robot. The positions of the calibration objects on the second virtual reference disc 27c may be expressed with respect to the robot coordinate system of the first robot using the determined relation between the coordinate systems of the robots, as described above.

Figure 9:
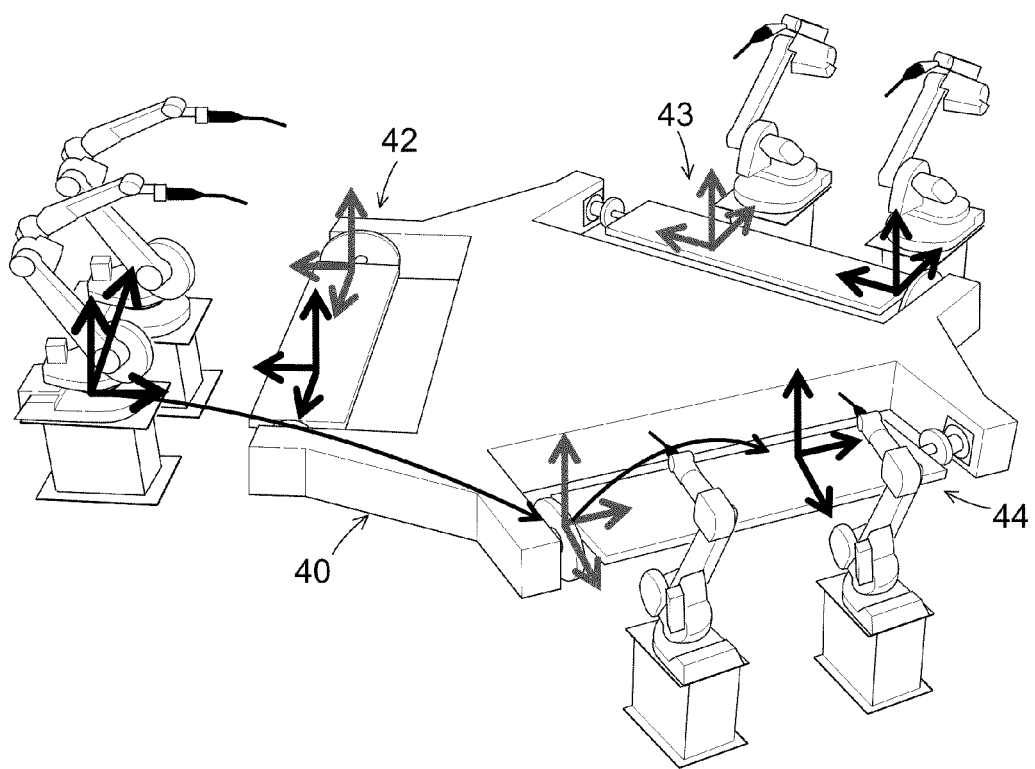
FIG. 9 illustrates calibration of a plurality of robots working on a positioner having three stations.

FIG. 9 shows a robot system including a plurality of robots working on a positioner 40 including a plurality of stations 42-44. Each station has a fixture for holding one or more workpieces. The same calibration method as described above can be used for calibration of this type of robot system. At each station one or more robots are carrying out work on one or more workpieces hold by the fixture. Each station is rotatable about at least one rotational axis. In the robot system shown in FIG. 9, corrected coordinate systems will be calculated and associated with the stations of the positioner for all robots in all stations. All robots will hold an array of corrected object coordinate systems, one for each of the three stations. By using the calibrated object coordinate system corresponding to the station facing the robot, the same robot program may be used without touchups for all stations. Since all robots are calibrated with respect to all fixtures, it is also possible to move tasks between controller groups.

Figure 10:
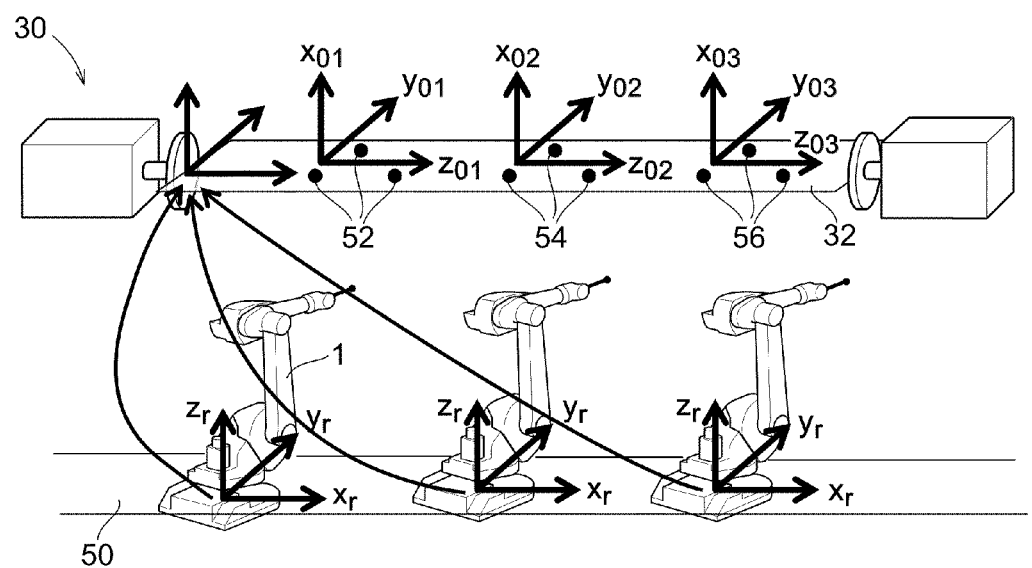
FIG. 10 illustrates calibration of a robot system including a positioner and a robot moved by a liner track.

FIG. 10 shows a robot system including a robot 1, a linear track 50, and a positioner 30 having a fixture 32. The linear track 50 is configured to move the robot 1 along a linear axis and to stop the robot at different positions on the axis. The robot is configured to carry out work on a plurality of workpieces held by the positioner 30 and located at different positions at the fixture 32. In the example shown in FIG. 10 three work objects are to be processed by the robot in the different positions. The target point on the path to be followed when the robot processes the first object is programmed with respect to a first object coordinate system $x_{o1}$, $y_{o1}$, $z_{o1}$, the target point on the path to be followed when the robot processes the second object is programmed with respect to a second object coordinate system $x_{o2}$, $y_{o2}$, $z_{o2}$, and the target point on the path to be followed when the robot processes the third object is programmed with respect to a third object coordinate system $x_{o3}/y_{o3}$, $z_{o3}$. The robot is movable between three positions along the linear track. When the robot is in the first position it carries out work on the first work object.

When the robot is in the second position it carries out work on the second work object, and when the robot is in the third position work it carries out work on the third work object.

This robot system can be calibrated by the same method as described above. Three sets of calibration objects 52, 54, 56 are positioned on the fixture 32 within the working range of the robot at the three positions along the linear track. The relation between the positioner coordinate system and the robot coordinate system is determined for each of the positions along the linear track. The relation between the object coordinate system and the positioner coordinate system is also determined for object on the positioner. Accordingly, each position on the track is calibrated in order to compensate for kinematic imperfections of the track. Further, the orientation of the track 50 with respect to the positioner coordinate system may be calculated by moving the robot along the track in increments defining the position of a fixed reference point on the fixture with respect to each incremental position.

Further it is possible to determining the direction of the linear axis by determining the position of at least one of the calibration objects for at least two different locations along the linear axis by means of the robot and the calibration tool, and determining the direction of the linear axis based on the determined positions.

The invention claimed is:

1. A method for calibration of an industrial robot system comprising:
    at least one robot (1; 1*a-c*) having a first robot coordinate system ($x_{r1}$, $y_{r1}$, $z_{r1}$) and configured to process a workpiece,
    a robot controller (3) including a processor (20) and a data storage (22), and
    a positioner (2; 30) adapted to hold the workpiece and to change an orientation of the workpiece by rotating it about a rotational axis while the robot processes the workpiece, and target points for a robot are programmed with respect to a first object coordinate system ($x_{o1}$, $y_{o1}$, $z_{o1}$), wherein the method comprises:
    defining a positioner coordinate system ($x_p$, $y_p$, $z_p$) for the positioner in which said rotational axis is an axis of the positioner coordinate system,
    providing the positioner with at least three calibration objects (24*a-e*; 36*a-e*) which positions are known in the first object coordinate system,
    providing the robot with a calibration tool (26),
    determining the positions of at least three of calibration objects with respect to the first robot coordinate system by means of the robot and the calibration tool,
    rotating the positioner about its rotational axis,
    determining the positions of a first calibration object (24*a*) for at least three different angles of the rotational axis by means of the robot and the calibration tool,
    determining the positions of a second of said calibration objects (24*b*), located at a distance from the first calibration object along the rotational axis of the positioner, for at least three different angles of the axis,
    determining a direction of the rotational axis of the positioner in the first robot coordinate system based on the determined positions of the first and second calibration objects for the at least three different angles of the axis,
    converting the positions of the at least three calibration objects determined with respect to the first robot coordinate system and the positions of the at least three calibration objects known with respect to the first object coordinate system into a common coordinate system, and
    determining a relation between the first object coordinate system and the positioner coordinate system by performing a best fit between the known and the determined positions of the at least three calibration objects in the common coordinate system.

2. The method according to claim 1, wherein the position of said second calibration object is determined for at least three different angles of the axis by the robot and its calibration tool.

3. The method according to claim 1, wherein the robot system comprises a second robot (1*b*) having a second robot coordinate system ($x_{r2}$, $y_{r2}$, $z_{r2}$) and configured to process a workpiece, and the positioner (30) is adapted to hold the workpiece and to change the orientation of the workpiece by rotating it about said rotational axis while the second robot processes the workpiece, and target points for the second robot are programmed with respect to a second object coordinate system ($x_{o2}$, $y_{o2}$, $z_{o2}$), and at least three calibration objects (36*c-e*) are located within a working range of the robots, and the positions of the calibration objects are known in the second object coordinate system, wherein the method further comprises:
    providing the second robot with a calibration tool (26*b*),
    determining the positions of said at least three of the calibration objects in the second robot coordinate system by means of the second robot and its calibration tool,
    determining the relation between the first and second robot coordinate system by performing a best fit between the determined positions of the calibration objects in the first robot coordinate system and the determined positions of the calibration objects in the second robot coordinate system,
    converting the positions of the at least three calibration objects determined with respect to the second robot coordinate system and the positions of the at least three calibration objects known with respect to the second object coordinate system into a common coordinate system, and
    determining the relation between the second object coordinate system and the positioner coordinate system by performing a best fit between the known and the determined positions of the at least three calibration objects in the common coordinate system.

4. The method according to claim 3, wherein the position of said second calibration object is determined for at least three different angles of the axis by means of the second robot and its calibration tool.

5. The method according to claim 1, wherein said calibration objects are spherical and the calibration tool has a tip of a spherical shape, and the method comprises:
    determining a tool center point of the calibration tool, and
    automatically determining the positions of the calibration objects by repeatedly moving the robot to the calibration object such that the calibration tool is in contact with the calibration object at a plurality of different contact points, reading the robot positions at the contact points, and calculating a center point of the calibration object in the robot coordinate system based on a read robot position and the tool center point of the calibration tool.

6. The method according to claim 1, wherein the determining of the position and direction of the rotational axis further comprises: determining a first position (C1) on the axis as a center of a first circle defined by the determined positions (P1-P3) of the first calibration object (24a), and determining a second position (C2) on the axis as the center of a second circle defined by the determined positions (P4-P6) of the second calibration object (24c), and determining the direction of the rotational axis based on said determined first and second positions on the axis.

7. The method according to claim 1, wherein an origin of the positioner coordinate system is defined in relation to a certain mechanical part (7) of the positioner, and the method further comprises:
determining a tool center point of the calibration tool,
moving the calibration tool of the robot into contact with said certain mechanical part of the positioner,
reading a robot position during the contact, and
determining the origin of a coordinate system of the positioner based on the read robot position, the tool center point of the tool, and the direction of a rotational axis.

8. The method according to claim 7, wherein said part of the positioner is a rotational disc (7) fixedly connected to one end of the rotational axis.

9. The method according to claim 1, wherein the positioner is provided with at least five spherical calibration objects (24a-e; 36a-e) located within a working range of the robot, and the positions of the at least five of the calibration objects are determined with respect to a robot coordinate system or system.

10. The method according to claim 1, wherein the calibration objects are positioned in or in close proximity to an area in which the robot processes the workpiece.

11. The method according to claim 1, wherein a system comprises a mechanical unit (50) moving the robot along a linear axis, and the method comprises:
moving the robot along the linear axis,
determining the position of at least one of the calibration objects for at least two different locations along the linear axis by means of the robot and the calibration tool, and
determining the direction of the linear axis based on the determined positions.

12. An apparatus for calibration of an industrial robot system including at least one robot (1; 1a-c) having a first robot coordinate system $(x_{r1}, y_{r1}, z_{r1})$ and configured to process a workpiece, and a positioner (2; 30) adapted to hold the workpiece and to change an orientation of the workpiece by rotating it about a rotational axis while the robot processes the workpiece, wherein target points for the robot are programmed with respect to a first object coordinate system $(x_{o1}, y_{o1}, z_{o1})$, and a positioner coordinate system $(x_p, y_p, z_p)$ is defined for the positioner in which said rotational axis is also an axis of the positioner coordinate system $(x_p, y_p, z_p)$, the apparatus comprising:
a robot controller (3) including a processor (20) and a data storage (22),
at least three calibration objects (24a-e; 36a-e) arranged on the positioner, the positions of the at least three calibration objects are known in the first object coordinate system and stored in said data storage,
a calibration tool (26) to be held by the robot, and
the robot controller is configured to:
automatically determine and store the positions of at least three of the calibration objects with respect to the first robot coordinate system by moving the calibration tool into contact with the calibration objects and reading robot positions at contact points,
instruct the positioner to rotate about its rotational axis,
automatically determine and store the positions of a first (24a) of said calibration objects for at least three different angles of the rotational axis by moving the calibration tool into contact with the first calibration object at the three different angles and reading robot positions (P1-3) at the contact points,
automatically determine and store the positions of a second (24c) of said calibration objects, located at a distance from the first calibration object along the rotational axis of the positioner, for at least three different angles of the axis, by moving the calibration tool into contact with the second calibration object at the three different angles and reading robot positions (P4-6) at the contact points,
determine and store a direction of the rotational axis of the positioner in the first robot coordinate system based on determined positions of the first and second calibration objects for the at least three different angles of the axis,
convert the positions of the at least three calibration objects determined with respect to the first robot coordinate system and the positions of the at least three calibration objects known with respect to the first object coordinate system into a common coordinate system, and to
determine and store a relation between the first object coordinate system and the positioner coordinate system by performing a best fit between a known and the determined positions of the at least three calibration objects in the common coordinate system.

13. The apparatus according to claim 12, wherein a robot system comprises a second robot (1b) having a second robot coordinate system $(x_{r2}, y_{r1}, z_{r1})$ and configured to process a workpiece, and the positioner is adapted to hold the workpiece and to change the orientation of the workpiece by rotating it about said rotational axis while the second robot (1b) processes the workpiece, and target points for the second robot (1b) are programmed with respect to a second object coordinate system, and said at least three calibration objects are located within a working range of robots, and the positions of calibration objects are known in the second object coordinate system, wherein the apparatus further comprises a second calibration tool to be held by the second robot (1b), and the robot controller is further configured:
to automatically determine and store the positions of said at least three of the calibration objects in the second robot coordinate system by moving the second calibration tool into contact with the calibration objects and reading the positions of the second robot at the contact points,
to determine the relation between the first and second robot coordinate system by performing a best fit between the determined positions of the calibration objects in the first robot coordinate system and the determined positions of the calibration objects in second robot coordinate system,
to convert the positions of the at least three calibration objects determined with respect to the second robot coordinate system and the positions of the at least three calibration objects known with respect to the second object coordinate system into a common coordinate system, and
to determine the relation between the second object coordinate system and the positioner coordinate system by performing a best fit between the known and the determined positions of the at least three calibration objects in the common coordinate system.

14. The method according to claim 2, wherein said calibration objects are spherical and the calibration tool has a tip of a spherical shape, and the method comprises:
determining tool center points of the calibration tool, and automatically determining the positions of the calibration objects by repeatedly moving the robot to the calibration object such that the calibration tool is in contact with the calibration object at a plurality of different contact points, reading robot positions at different contact points, and calculating the center point of the calibration object in the robot coordinate system based on a read robot position and the tool center point of the calibration tool.

15. The method according to claim 3, wherein said calibration objects are spherical and the calibration tool has a tip of a spherical shape, and the method comprises:

determining tool center points of the calibration tool, and
automatically determining the positions of the calibration objects by repeatedly moving the robot to the calibration object such that the calibration tool is in contact with the calibration object at a plurality of different contact points, reading robot positions at contact points, and calculating a center point of the calibration object in the robot coordinate system based on read robot positions and the tool center point of the calibration tool.

16. The method according to claim 4, wherein said calibration objects are spherical and the calibration tool has a tip of a spherical shape, and the method comprises:

determining tool center points of a calibration tool, and
automatically determining the positions of the calibration objects by repeatedly moving the robot to the calibration object such that the calibration tool is in contact with the calibration object at a plurality of different contact points, reading robot positions at contact points, and calculating a center point of the calibration object in the robot coordinate system based on the read robot positions and the tool center point of the calibration tool.

17. The method according to claim 2, wherein the determining of the position and direction of the rotational axis further comprises: determining a first position (C1) on the axis as a center of a first circle defined by determining positions (P1-P3) of a calibration object (24a), and determining a second position (C2) on the axis as the center of a second circle defined by determined positions (P4-P6) of a second calibration object (24c), and determining the direction of the rotational axis based on said determined first and second positions on the axis.

18. The method according to claim 3, wherein the determining of the position and direction of the rotational axis further comprises: determining a first position (C1) on the axis as a center of a first circle defined by determining positions (P1-P3) of a calibration object (24a), and determining a second position (C2) on the axis as the center of a second circle defined by determined positions (P4-P6) of a second calibration object (24c), and determining the direction of the rotational axis based on said determined first and second positions on the axis.

19. The method according to claim 4, wherein the determining of the position and direction of the rotational axis further comprises: determining a first position (C1) on the axis as a center of a first circle defined by determining positions (P1-P3) of a calibration object (24a), and determining a second position (C2) on the axis as the center of a second circle defined by determined positions (P4-P6) of a second calibration object (24c), and determining the direction of the rotational axis based on said determined first and second positions on the axis.

20. The method according to claim 5, wherein the determining of the position and direction of the rotational axis further comprises: determining a first position (C1) on the axis as a center of a first circle defined by determining positions (P1-P3) of a calibration object (24a), and determining a second position (C2) on the axis as the center of a second circle defined by determined positions (P4-P6) of a second calibration object (24c), and determining the direction of the rotational axis based on said determined first and second positions on the axis.

* * * * *